United States Patent
Crimmins et al.

(10) Patent No.: US 6,874,818 B2
(45) Date of Patent: Apr. 5, 2005

(54) ENERGY ABSORBING SEAT BELT ANCHORAGE

(75) Inventors: Daniel E Crimmins, Holly, MI (US); Steven F Snyder, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 128 days.

(21) Appl. No.: 10/458,967

(22) Filed: Jun. 11, 2003

(65) Prior Publication Data

US 2004/0251674 A1 Dec. 16, 2004

(51) Int. Cl.[7] .............................................. B60R 22/28
(52) U.S. Cl. ...................................... 280/805; 280/808
(58) Field of Search ................................ 188/374, 377; 280/801.2, 805, 751, 808

(56) References Cited

U.S. PATENT DOCUMENTS

| | | | | |
|---|---|---|---|---|
| 5,529,344 A | * | 6/1996 | Yasui et al. .................. | 280/808 |
| 5,685,566 A | * | 11/1997 | Hirase et al. ............ | 280/801.1 |
| 5,779,270 A | * | 7/1998 | Tanaka ........................ | 280/808 |
| 5,826,907 A | * | 10/1998 | Saito et al. .................. | 280/808 |
| 5,836,613 A | * | 11/1998 | Saito et al. .................. | 280/808 |
| 5,842,719 A | * | 12/1998 | Tanaka ........................ | 280/805 |
| 5,863,071 A | * | 1/1999 | Li-Calso ................... | 280/801.1 |
| 5,941,567 A | * | 8/1999 | Wickenheiser .............. | 280/808 |
| 6,007,100 A | * | 12/1999 | Steffens, Jr. .............. | 280/801.1 |
| 6,106,012 A | * | 8/2000 | Boegge et al. ............ | 280/801.1 |
| 6,168,206 B1 | * | 1/2001 | Greib et al. ................. | 280/808 |
| 6,273,469 B1 | * | 8/2001 | Kwaske et al. ............. | 280/805 |
| 6,302,477 B1 | * | 10/2001 | Satou ..................... | 296/187.05 |
| 6,354,628 B1 | * | 3/2002 | Deb et al. .................... | 280/805 |
| 6,749,224 B1 | * | 6/2004 | Stojanovski ............. | 280/801.2 |

* cited by examiner

*Primary Examiner*—Paul N. Dickson
*Assistant Examiner*—Laura B. Rosenberg
(74) *Attorney, Agent, or Firm*—Ralph E. Smith

(57) ABSTRACT

A seat belt anchorage has a tubular housing adapted to be mounted on support structure of a vehicle. The housing has a cylindrical wall. A nut is axially slidable along the inner surface of the cylindrical wall. The housing has a transverse wall at an inner end of the cylindrical wall. The transverse wall has a tapered surface. The transverse wall has an annular abutment ring inwardly of the tapered surface defining a central opening. The nut has a tapered side in contact with the tapered surface of said transverse wall and an end in contact with the abutment ring. A bolt has a shank extending through the opening and threaded into the nut. The bolt has a head exteriorly of the housing and a collar on the shank between the head and the abutment ring. A seat belt supporting plate is mounted on the collar. The bolt in normal use is tightened to draw the tapered side of the nut against the tapered surface of the transverse wall and to draw the collar against the abutment ring. In a crash, when the head of an occupant of the vehicle strikes the bolt and urges the bolt outwardly, the collar deforms the abutment ring to absorb the energy of the impact.

7 Claims, 2 Drawing Sheets

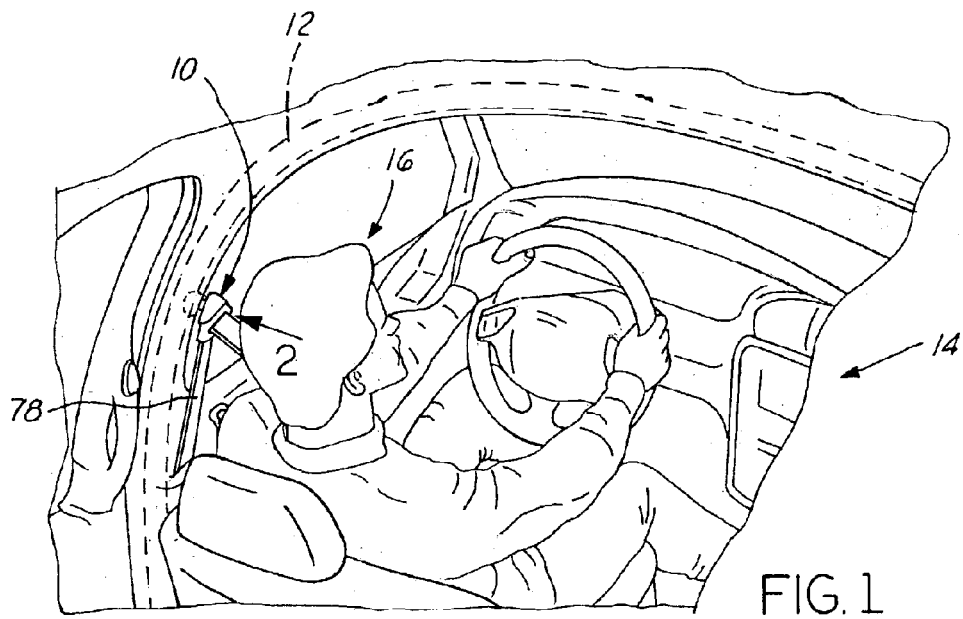
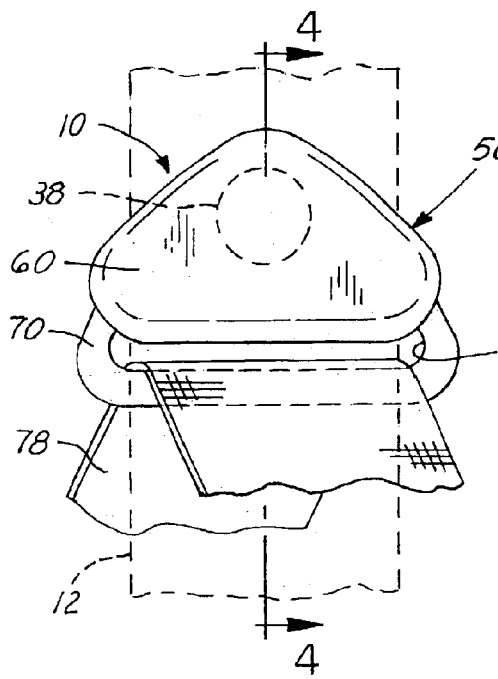
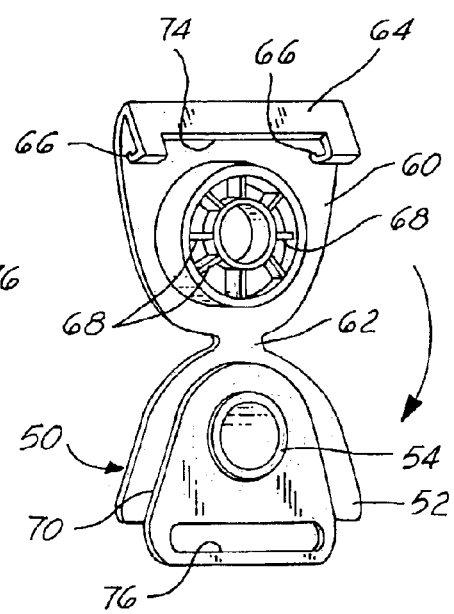

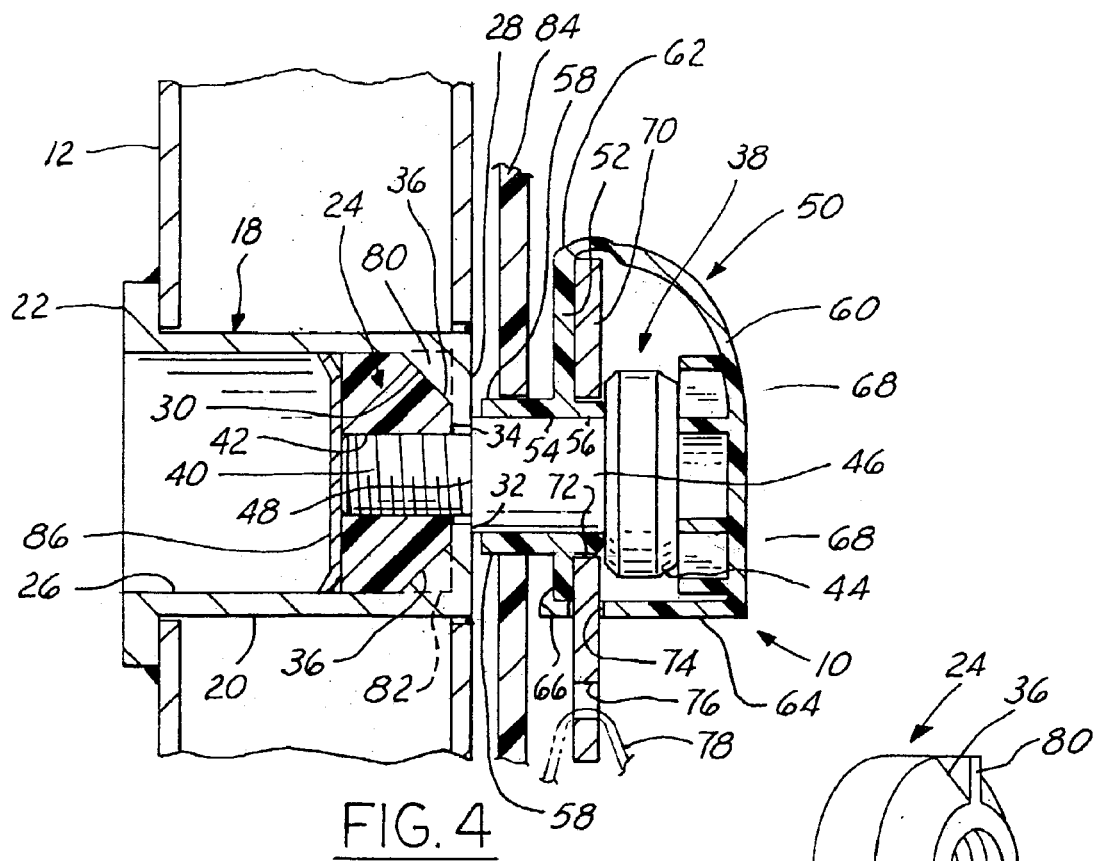
FIG. 4
FIG. 5
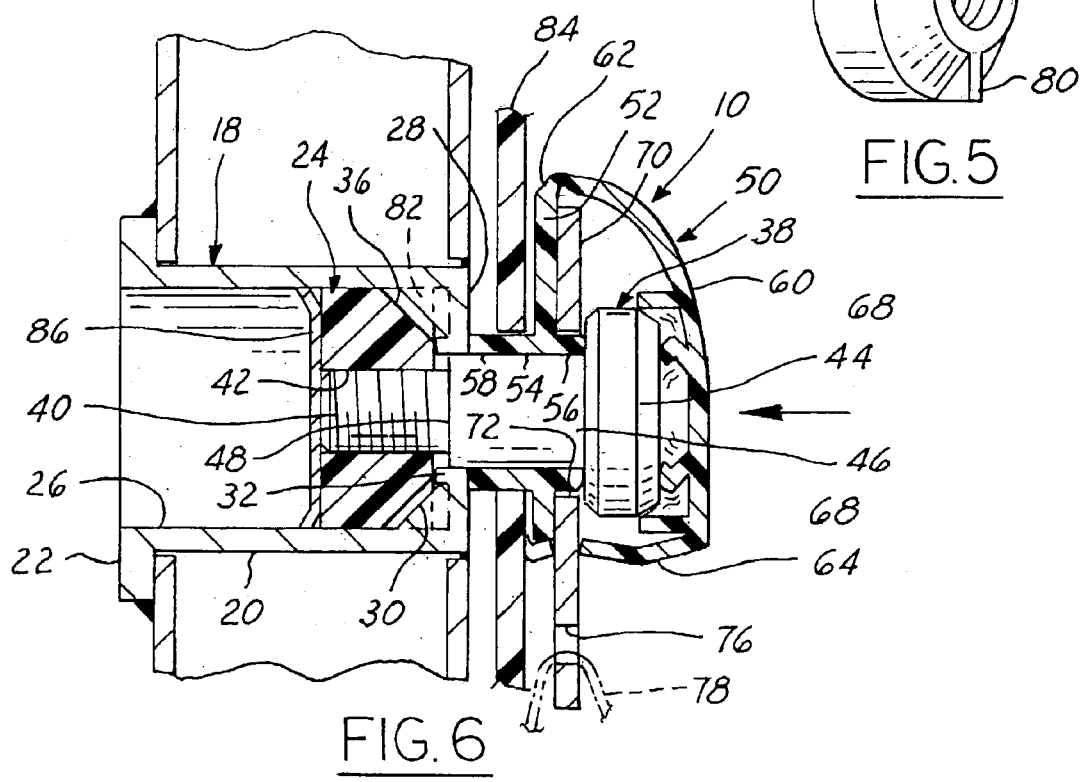
FIG. 6

ENERGY ABSORBING SEAT BELT ANCHORAGE

This invention relates generally to seat belt anchorages and more particularly to a seat belt anchorage having an energy absorbing capability.

BACKGROUND OF THE INVENTION

When a vehicle is involved in a collision, especially a side impact collision, the head of an occupant of the vehicle could be thrown against a seat belt anchorage. Accordingly, the present invention addresses such a situation by providing a seat belt anchorage designed to cushion and absorb the energy of an impact.

SUMMARY OF THE INVENTION

In accordance with the present invention, a seat belt anchorage is provided having a tubular housing adapted to be mounted on vehicle support structure such, for example, as a roll bar. The housing has a cylindrical wall. A nut is axially slidable along the inner surface of the cylindrical wall. The housing also has a transverse end wall provided with a tapered inner surface. The nut has a tapered side in surface-to-surface contact with the tapered surface of the transverse wall.

The transverse wall also has an annular abutment ring radially inwardly of the tapered surface defining a central opening. The end of the nut engages the abutment ring.

A bolt has a shank extending through the opening in the transverse wall which threadedly engages the nut. The bolt has a head on the outer end of the shank exteriorly of the housing and a collar between the head and the abutment ring. A seat belt supporting plate is mounted on the collar.

In normal use, the bolt is tightened relative to the nut to draw the tapered side of the nut against the tapered surface of the transverse wall and to press the collar against the abutment ring. Accordingly, in a crash when the head or other body part of the occupant strikes the head of the bolt, the collar deforms the abutment ring to absorb the energy of the impact.

Further, in accordance with the invention, the tapered surface of the transverse wall is frusto-conical. Preferably, the nut has keys which extend into slots in the transverse wall of the housing to prevent the nut from rotating when the bolt is threaded into the nut.

Preferably, a casing is provided to cover the head of the bolt and the seat belt supporting plate. The casing has crush ribs which crush against the head of the bolt when the head of an occupant is thrown against the anchorage to further cushion and absorb the energy of the impact.

One object of this invention is to provide a seat belt anchorage having the foregoing features and capabilities.

Another object of the invention is to provide a seat belt anchorage which is composed of a relatively few simple parts and is capable of being inexpensively manufactured and assembled.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a fragmentary perspective view of an interior of a vehicle showing mounted therein adjacent the driver of the vehicle a seat belt anchorage constructed in accordance with the invention;

FIG. 2 is a view looking in the direction of the arrow 2 in FIG. 1;

FIG. 3 is a perspective view showing a casing for a bolt which forms part of the anchorage. The casing is shown open with the cover flipped up to show a seat belt supporting plate mounted on a hub of the base of the casing. The bolt forming part of the seat belt anchorage is omitted.

FIG. 4 is a sectional view taken on the line 4—4 in FIG. 2;

FIG. 5 is a perspective view of a nut forming part of the seat belt anchorage; and FIG. 6 is a view similar to FIG. 4 but shows the position of the parts after the vehicle has been involved in a collision and the head of the driver has been thrown against the anchorage.

DETAILED DESCRIPTION OF THE PREFERRED EMBODIMENT

The following description of the preferred embodiment is merely exemplary in nature and is in no way intended to limit the invention, its application or uses.

Referring to FIG. 1, there is shown a seat belt anchorage 10 mounted on rigid support structure, in this instance a roll bar 12, of an automotive vehicle 14 in a position adjacent to a side of the head of a driver 16.

Referring to FIGS. 2–6, the anchorage 10 includes a tubular sleeve or housing 18 made of metal or the like. The housing 18 has a cylindrical wall 20 provided with an annular flange 22 secured to the roll bar 12, as by welding. A nut 24, sometimes referred to as a wedge, is axially slidable along the radially inner surface 26 of the cylindrical wall 20.

The housing 18 has a transverse wall 28 at the inner end of the cylindrical wall 20. The transverse wall 28 has an annular, axially inner, tapered surface 30 which tapers axially and radially inwardly from the axially inner end of the inner surface 26 of the cylindrical wall, preferably at an angle of about 45° to the longitudinal center line of the cylindrical wall 20. The transverse wall 20 also has an annular abutment ring 32 extending radially inwardly from the tapered surface 30, defining a central opening 34.

The nut 24 has at its inner end an annular tapered side 36 which tapers axially and radially inwardly at the same angle as the tapered surface 30.

A bolt 38 has a threaded shank 40 which extends through the opening 34 and threads into a threaded central opening 42 in the nut 24. The bolt 38 has a head 44 on the inner end of the shank 40 exteriorly of the housing 18, and a collar 46 on the shank 40 between the head 44 and the abutment ring 32. The collar 46 is of larger diameter than the shank, having a shoulder 48 opposed to the abutment ring 32.

A casing 50 is provided to cover the head 44 of the bolt 38. The casing 50 has a generally flat base 52 provided with a tubular hub 54 that extends through the base 52 and rotatably receives the collar 46 of the shank 40 of the bolt 38. The hub 54 has an inner end portion 56 which extends into the casing 50 and an outer end portion 58 which extends outwardly beyond the base 52 of the casing, terminating close to the transverse wall 28 of the housing.

The casing 50 has a lid or cover 60 hinged to the base as by a flexible living hinge 62. The cover 60 is shown open in FIG. 3 and has rim or flange 64 on a side opposite the hinge 62 provided with retainers 66 which are adapted to snap over and engage an edge of the base 52 of the casing 50 to hold the cover closed as in FIG. 4.

The cover 60 has a series of crush ribs 68 on its inner surface which engage the head 44 of the bolt 38 when the cover is closed as in FIG. 4.

A seat belt supporting plate 70 in the casing 50 has an opening 72 through which the inner end portion 56 of the hub 54 loosely extends so that the plate 70 is free to rotate. The plate 70 extends out of the casing 50 through a notch 74 in the flange 64 of the cover 60. The portion of the plate 70 on the outside of the casing 50 has a slot 76 to receive a seat belt 78.

The nut 24 has circumferentially spaced, radially outwardly projecting keys 80 which extend into slots 82 in the transverse wall 28 to prevent the nut from rotating when the bolt 38 is threaded into the nut.

An interior vehicle liner 84 is shown between the roll bar 12 and the casing 50.

The anchorage 10 is shown in the normal position of the parts in FIG. 4 in which the nut 24 is pressed against the transverse wall 28 of the housing 18 by a retainer washer 86. The bolt 38 has been tightened to draw the tapered side 36 of the nut 24 into firm surface-to-surface contact with the tapered surface 30 of the transverse wall 28 of the housing 18. The crush ribs 68 overlie the head 44 of the bolt, and the shoulder 48 of the collar 46 is closely adjacent to the abutment ring 32.

In a crash, specifically in this instance when a side collision is involved and the head of the occupant is thrown against the anchorage, the head of the occupant strikes the cover 60 of the casing 50 imposing an impact on the head 44 of the bolt 38 forcing the bolt outwardly as in FIG. 6 and the shoulder 48 of the collar 46 to deform and bend the abutment ring 32 outwardly. At the same time, the crush ribs 68 crush against the head 44 of the bolt 38. The resistance of the abutment ring 32 to bending absorbs energy. The crushing of the ribs 68 contributes to the absorption of energy. The result is less of an impact on the head of the driver.

The description of the invention is merely exemplary in nature and thus, variations that do not depart from the gist of the invention are intended to be within the scope of the invention. Such variations are not to be regarded as a departure from the spirit and scope of the invention.

What is claimed is:

1. A seat belt anchorage for a vehicle capable of absorbing energy caused by a body part of an occupant of the vehicle striking the anchorage when the vehicle is involved in a crash, said seat belt anchorage comprising:

a tubular housing adapted to be mounted on vehicle support structure, said housing having a cylindrical wall, a nut axially slidable along a radially inner surface of said cylindrical wall, said housing having a transverse wall at an inner end of said cylindrical wall, said transverse wall having an axially inner tapered surface tapering axially and radially inwardly from an axially inner end of the inner surface of said cylindrical wall, said transverse wall having an annular abutment ring radially inwardly of said tapered surface defining a central opening, said nut having a tapered side in surface-to-surface contact with the tapered surface of said transverse wall and an end in surface-to-surface contact with said abutment ring, a bolt having a shank extending through said opening and threadedly engaging said nut, said bolt having a head on an inner end of said shank exteriorly of said housing and a collar on said shank between said head and said abutment ring, and a seat belt supporting plate mounted on said collar, said bolt in normal use being tightened relative to said nut to draw the tapered side of the nut against the tapered surface of said transverse wall and to draw the collar against the abutment ring, whereby in a crash, when the body part of the occupant imposes an impact on the head of the bolt and urges said bolt outwardly, the collar deforms the abutment ring to absorb the energy of the impact.

2. The seat belt anchorage of claim 1, wherein the tapered surface of said transverse wall is frusto-conical.

3. The seat belt anchorage of claim 1, wherein said nut has keys extending into slots in said transverse wall for preventing said nut from rotating relative to said housing.

4. The seat belt anchorage of claim 1, further including a casing enclosing the head of the bolt.

5. The seat belt anchorage of claim 4, wherein said casing has a cover over said head provided with crush ribs to cushion the impact of the body part of the occupant against the head.

6. The seat belt anchorage of claim 5, wherein the tapered surface of said transverse wall is frusto-conical and tapers at an angle of about 45° to a longitudinal center line of the cylindrical wall.

7. The seat belt anchorage of claim 6, wherein said nut has keys extending into slots in said transverse wall for preventing said nut from rotating relative to said housing.

* * * * *